May 7, 1946.　　　　　A. COX　　　　　2,399,858
OPTICAL OBJECTIVE
Filed Oct. 2, 1944
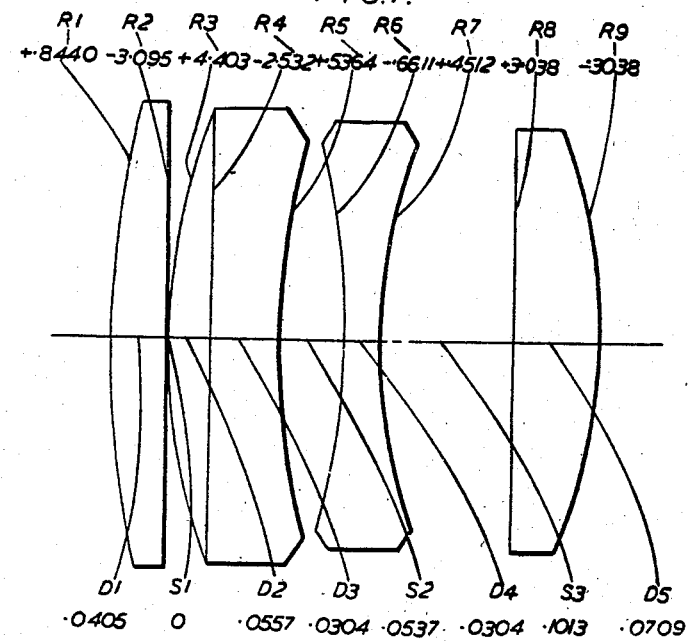
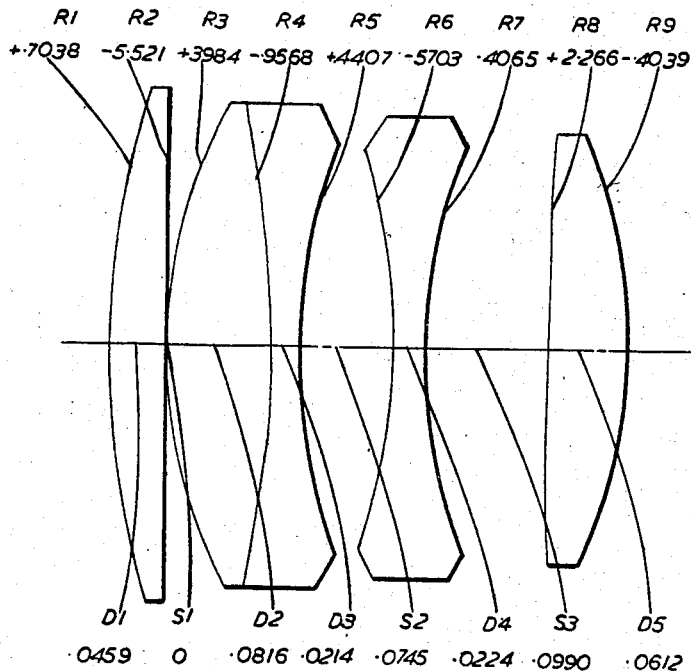
Inventor
ARTHUR COX
By Emery Holcombe & Blair
Attorney Patented May 7, 1946

2,399,858

UNITED STATES PATENT OFFICE 2,399,858

OPTICAL OBJECTIVE

Arthur Cox, Leicester, England, assignor to Taylor, Taylor & Hobson Limited, Leicester, England, a company of Great Britain Application October 2, 1944, Serial No. 556,851
In Great Britain August 2, 1944

5 Claims. (Cl. 88—57)

This invention relates to an optical objective, for photographic or other purposes, corrected for spherical and chromatic aberrations, coma, astigmatism, field curvature and distortion, and comprising a double-concave divergent component disposed behind two convergent components and in front of another convergent components. It is to be understood that the side of the longer conjugate is herein regarded as the "front" of the objective in accordance with the usual convention.

In such objective the four components usually each consist of a simple element, but it has been proposed to make the convergent second component compound so that it consists of a double-convex element cemented in front of a double-concave element. In one such arrangement, the cemented surface in the second component is utilised to provide differential under-correction of red and blue light for the marginal rays, so as to make the objective substantially achromatic both for the axial and for the marginal rays. This involves giving the cemented surface relatively deep curvature with a small difference (of the order of 0.02) between the mean refractive indices of the two elements cemented together. In another arrangement the cemented surface is used for a quite different purpose, namely, to obtain a very high relative aperture of, say, F/1.5 without reducing the back focal length, the surface in this case being much shallower and having a somewhat greater index difference, say between 0.025 and 0.045, across it. In both these arrangements the material of the double-convex element has higher index than that of the double-concave element.

The present invention again uses a second component consisting of a double-convex element of higher mean refractive index cemented in front of a double-concave element of lower index, but for yet another quite different purpose, namely to provide improved correction for oblique spherical aberration.

To this end according to the invention the mean refractive index of the material of the double-convex element in the second component exceeds that of the double-concave element cemented to it by at least 0.06, and the radius of curvature of the front surface of the simple divergent third component bears to that of the rear surface thereof a ratio between 1.0 and 2.0, the axial air separation between the second and third components lying between 0.04 and 0.085 times the equivalent focal length of the objective. The radius of curvature of the front surface of the front component preferably lies between 0.6 and 0.9 times the equivalent focal length of the objective, and that of the rear surface of the second component is preferably not greater than 0.6 times such focal length.

In the accompanying drawing,

Figures 1 and 2 respectively illustrate two convenient practical examples of objective according to the invention.

Numerical data for these two examples are given in the following tables, in which $R_1$, $R_2$ ... represent the radii of curvature of the individual surfaces (the positive sign indicating that the surface is convex to the front and the negative sign that it is concave thereto), $D_1$, $D_2$ ... represent the axial thicknesses of the lens elements, and $S_1$, $S_2$, $S_3$ represent the axial air separations between the components. The tables also give the mean refractive index for the D-line and the Abbé V number of the material used for each lens element.

Example I

Equivalent focal length 1.000. Relative aperture F/2.8

| Radius | Thickness or air separation | Refractive index $n_D$ | Abbé V number |
|---|---|---|---|
| $R_1$+.8440 | $D_1$ .0405 | 1.6130 | 55.7 |
| $R_2$−3.095 | $S_1$ 0.0 | | |
| $R_3$+.4403 | $D_2$ .0557 | 1.644 | 48.3 |
| $R_4$−2.532 | $D_3$ .0304 | 1.547 | 45.7 |
| $R_5$+.5364 | $S_2$ .0537 | | |
| $R_6$−.6011 | $D_4$ .0304 | 1.652 | 33.5 |
| $R_7$+.4512 | $S_3$ .1013 | | |
| $R_8$+3.038 | $D_5$ .0709 | 1.613 | 57.6 |
| $R_9$−.3972 | | | |

Example II

Equivalent focal length 1.000. Relative aperture F/2.5

| Radius | Thickness or air separation | Refractive index $n_D$ | Abbé V number |
|---|---|---|---|
| $R_1$+.7038 | $D_1$ .0459 | 1.6122 | 58.7 |
| $R_2$−5.521 | $S_1$ 0.0 | | |
| $R_3$+.3984 | $D_2$ .0816 | 1.6132 | 55.6 |
| $R_4$−.9568 | $D_3$ .0214 | 1.547 | 45.8 |
| $R_5$+.4407 | $S_2$ .0745 | | |
| $R_6$−.5703 | $D_4$ .0224 | 1.621 | 36.2 |
| $R_7$+.4065 | $S_3$ .0990 | | |
| $R_8$+2.266 | $D_5$ .0612 | 1.6132 | 55.6 |
| $R_9$−.4039 | | | |

The back focal length in Example I is .8146 and in Example II is .7231 times the equivalent focal length of the objective. It will be noticed that the index difference across the cemented surface in the second component is .097 in Example I and .066 in Example II, and the ratio between the radii $R_6$ and $R_7$ is approximately 1.33 in Example I and 1.40 in Example II. These examples are both well-corrected for oblique spherical aberration as well as for the usual primary aberrations.

What I claim as my invention and desire to secure by Letters Patent is:

1. An optical objective corrected for spherical and chromatic aberrations, coma, astigmatism, field curvature, distortion and oblique spherical aberration, and comprising four air-separated components, of which the first is a simple convergent component, the second a compound convergent component consisting of a double-convex convergent element cemented in front of a double-concave divergent element, the third a simple divergent component and the fourth a simple convergent component, the front surface of the front component having a radius lying between 0.6 and 0.9 times the equivalent focal length of the objective, the mean refractive index of the material used for double-convex element of the second component exceeding that for the double-concave element cemented to it by at least 0.06, whilst the radius of curvature of the front surface of the divergent third component lies between 1.0 and 2.0 times that of the rear surface thereof, the axial air separation between the second and third components lying between 0.04 and 0.085 times the equivalent focal length of the objective.

2. An optical objective corrected for spherical and chromatic aberrations, coma, astigmatism, field curvature, distortion and oblique spherical aberration, and comprising four air-separated components, of which the first is a simple convergent component, the second a compound convergent component consisting of a double-convex convergent element cemented in front of a double-concave divergent element, the third a simple divergent component and the fourth a simple convergent component, the rear surface of the second component having a radius of curvature not greater than 0.6 times the equivalent focal length of objective, the mean refractive index of the material used for the double-convex element of the second component exceeding that for the double-concave element cemented to it by at least 0.06, whilst the radius of curvature of the front surface of the divergent third component lies between 1.0 and 2.0 times that of the rear surface thereof, the axial air separation between the second and third components lying between 0.04 and 0.085 times the equivalent focal length of the objective.

3. An optical objective as claimed in claim 1 wherein the radius of curvature of the front surface of the front component is greater than that of the rear surface of the second component.

4. An optical objective having numerical data substantially as set forth in the following table:

Equivalent focal length 1.000. Relative aperture F/2.8

| Radius | Thickness or air separation | Refractive index $n_D$ | Abbé V number |
|---|---|---|---|
| $R_1$+.8440 | $D_1$ .0405 | 1.6130 | 55.7 |
| $R_2$−3.095 | $S_1$ 0.0 | | |
| $R_3$+.4403 | $D_2$ .0557 | 1.644 | 48.3 |
| $R_4$−2.532 | $D_3$ .0304 | 1.547 | 45.7 |
| $R_5$+.5364 | $S_2$ .0537 | | |
| $R_6$−.6011 | $D_4$ .0304 | 1.652 | 33.5 |
| $R_7$+.4512 | $S_3$ .1013 | | |
| $R_8$+3.038 | $D_5$ .0709 | 1.613 | 57.6 |
| $R_9$−.3972 | | | |

5. An optical objective having numerical data substantially as set forth in the following table:

Equivalent focal length 1.000. Relative aperture F/2.5

| Radius | Thickness or air separation | Refractive index $n_D$ | Abbé V number |
|---|---|---|---|
| $R_1$+.7038 | $D_1$ .0459 | 1.6122 | 58.7 |
| $R_2$−5.521 | $S_1$ 0.0 | | |
| $R_3$+.3984 | $D_2$ .0816 | 1.6132 | 55.6 |
| $R_4$−.9568 | $D_3$ .0214 | 1.547 | 45.8 |
| $R_5$+.4407 | $S_2$ .0745 | | |
| $R_6$−.5703 | $D_4$ .0224 | 1.621 | 36.2 |
| $R_7$+.4065 | $S_3$ .0990 | | |
| $R_8$+2.266 | $D_5$ .0612 | 1.6132 | 55.6 |
| $R_9$−.4039 | | | | in which $R_1$, $R_2$ . . . represent the radii of curvature of the individual surfaces, the positive sign indicating that the surface is convex to the front and the negative sign that it is concave thereto, $D_1$, $D_2$ . . . represent the axial thicknesses of the lens elements, and $S_1$, $S_2$, $S_3$ represent the axial air separations between the components.

ARTHUR COX.